United States Patent [19]
Chevillat et al.

[11] 4,400,616
[45] Aug. 23, 1983

[54] DOCUMENT CARD CONTAINING INFORMATION IN HOLOGRAPHIC FORM

[75] Inventors: Pierre R. Chevillat; Fritz Gfeller, both of Adliswil, Switzerland

[73] Assignee: International Business Machines Corporation, Armonk, N.Y.

[21] Appl. No.: 293,069

[22] Filed: Aug. 17, 1981

[30] Foreign Application Priority Data

Aug. 21, 1980 [EP] European Pat. Off. .......... 8010492.8

[51] Int. Cl.³ .............................................. G06K 19/06
[52] U.S. Cl. ................................... 235/487; 235/457; 350/3.61
[58] Field of Search ................ 235/457, 487; 350/3.61

[56] References Cited

U.S. PATENT DOCUMENTS

| | | | |
|---|---|---|---|
| 3,620,590 | 11/1971 | Barker | 350/3.5 |
| 3,647,275 | 3/1972 | Ward | 350/3.5 |
| 3,858,031 | 12/1974 | Kornfeld | 235/61.11 E |
| 4,119,361 | 10/1978 | Greenaway et al. | 350/1.1 |
| 4,143,810 | 3/1979 | Greenaway | 235/457 |
| 4,171,766 | 10/1979 | Ruell | 235/487 |

FOREIGN PATENT DOCUMENTS

| | | |
|---|---|---|
| 2659639 | 6/1978 | Fed. Rep. of Germany . |
| 1280457 | 7/1972 | United Kingdom . |
| 1502460 | 3/1978 | United Kingdom . |

OTHER PUBLICATIONS

W. Lukosz et al.: Hologram Recording and Read-Out with the Evanescent Field of Guided Waves, Optics Communications, vol. 19, No. 2, pp. 232-235, Nov., 1976.

*Primary Examiner*—Harold I. Pitts
*Attorney, Agent, or Firm*—E. Ronald Coffman

[57] ABSTRACT

An identification card provided with secret data contained in the form of a wave guide hologram recorded in a layer on the card. Light for developing or displaying the hologram is introduced into a wave guide layer extending along the surface of the card through a grating that admits light only of a given wave length suitable for developing the wave guide hologram. The secrecy of the wave guide hologram is further enhanced by incorporating into the light coupling grating a further hologram by which light only of a predetermined pattern can be coupled to the wave guide for delivery to the wave guide hologram.

5 Claims, 12 Drawing Figures

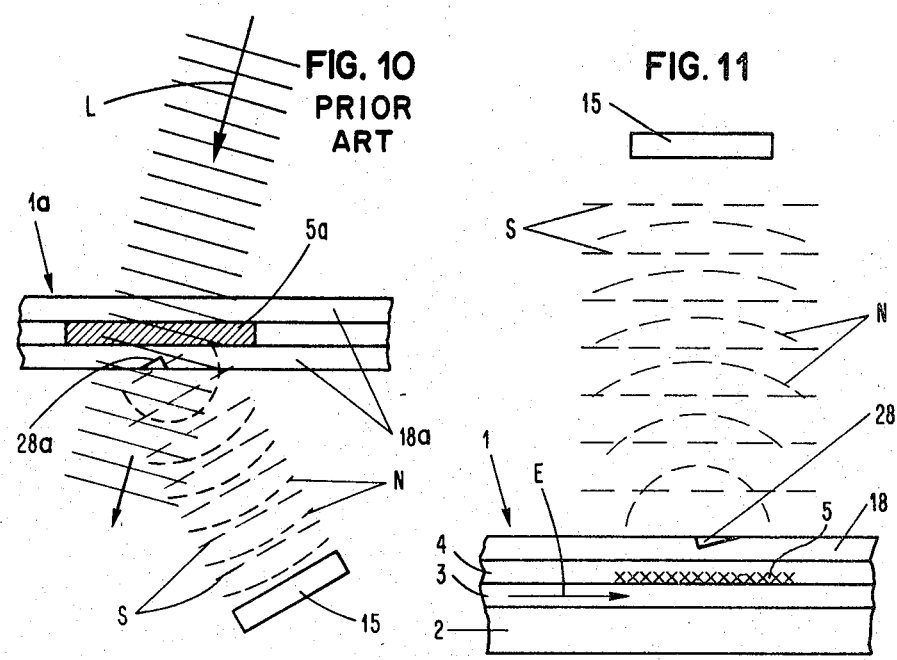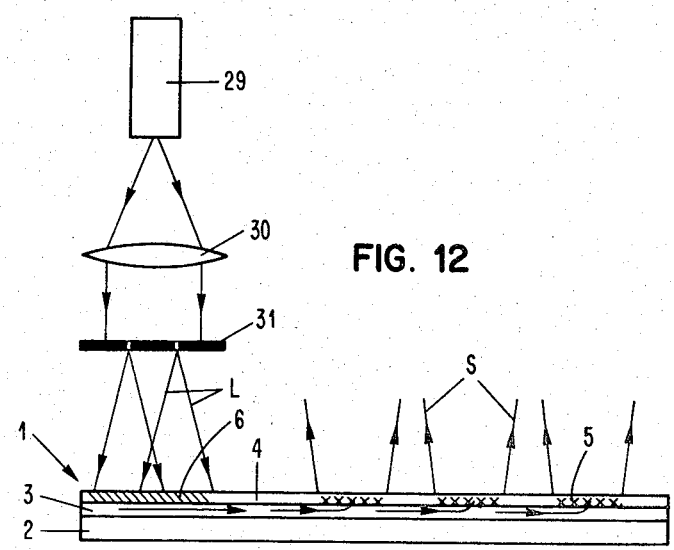

DOCUMENT CARD CONTAINING INFORMATION IN HOLOGRAPHIC FORM

FIELD OF THE INVENTION

The invention relates to a document card containing information in holographic form. Such cards have many uses, for instance as credit cards or cards giving to a legitimate owner access to places where access is restricted.

Similar document cards, having information stored by punching or magnetic recording have been known for some time. As a main disadvantage, they can readily be duplicated and, therefore, abuse is made easy. In looking up methods to enhance the safety with respect to falsification and counterfeiting, holography has revealed its potentiality.

DESCRIPTION OF THE PRIOR ART

German Pat. No. 1,939,594 describes a document card in which a given number is stored in binary coded form as a conventional amplitude or phase hologram. Although in this arrangement, information retrieval is not as easy as with other techniques, an unauthorized person can still obtain the information by using more sophisticated photo-technical means. Falsification, too, is possible since holograms can be substituted. If a document card is used frequently, the user will pocket it anywhere. Therefore, such cards are highly susceptible to wear and to damage. Experience shows that the signal-to-noise ratio of amplitude and phase holograms is rather poor. If additional degradation sets in, due to wear or damage, then such cards are rendered inoperative very soon.

German patent publication No. 2,613,034 discloses a document card with a hologram of the Lippmann-Bragg type for which the signal-to-noise ratio is enhanced by using the whole card surface for the hologram. On the one hand, this method provides better results; however, on the other hand, the amount of information that can be recorded is drastically reduced. Such holograms can be read rather easily by unauthorized people, but counterfeiting would be more difficult.

In German patent publication No. 2,166,913, a method to improve safety with respect to falsification is described. In this case, an information hologram is encrypted by introducing arbitrary phase differences in one light path by the means of wave distortion during manufacturing. Without precise knowledge of the key to the distorted light wave, the distortion cannot be compensated for during read-out of the hologram, and retrieval of the recorded information is impossible. But even a card with an encrypted conventional hologram suffers from the unfavorable signal-to-noise ratio. Thus, it is endangered by rapid wear damage from frequent use.

In a paper entitled, "Hologram recording and read-out with the evanescent field of guided waves", Optics Communications, Vol. 19, No. 2, November 1976, W. Lukosz and A. Wuthrich describe the recording and reading of holograms for which the evanescent field of a light wave propagating in a planar wave guide, is used as a reference and illuminating wave, respectively. This method, above all, shows promise of lessening the susceptibility to disturbances of the hologram paired with widening of its angle of aperture, both of which are real objects of the present invention.

SUMMARY OF THE INVENTION

In accordance with our invention, an identification card or document is provided with a planar transparent layer wave guide which contains one or more wave guide holograms. A wave guide hologram is readable in response to light entering the wave guide at a location displaced from the hologram. Light is permitted to enter the wave guide layer by a grating that is receptive of light of the particular wave length necessary to display the hologram-contained data. Thus, the hologram is visible only to persons knowing and having the capability of subjecting it to the correct light source in the correct manner. In a preferred arrangement of our invention, access is made additionally secure by including in the light coupling grating, a further hologram pattern by which only light of the proper wave length and conforming to the predetermined pattern will couple into the wave guide.

An identification card, in accordance with our invention, can bear plural recordings. Recordings that are more distant from the light coupling grating can be obliterated without interfering with the light path from the grating to recordings located somewhat nearer the grating.

BRIEF DESCRIPTION OF THE DRAWINGS

The invention is described below, by way of examples illustrated in the appended drawings. The figures of the drawings show.

DESCRIPTION OF THE PREFERRED EMBODIMENTS

Figure 1:
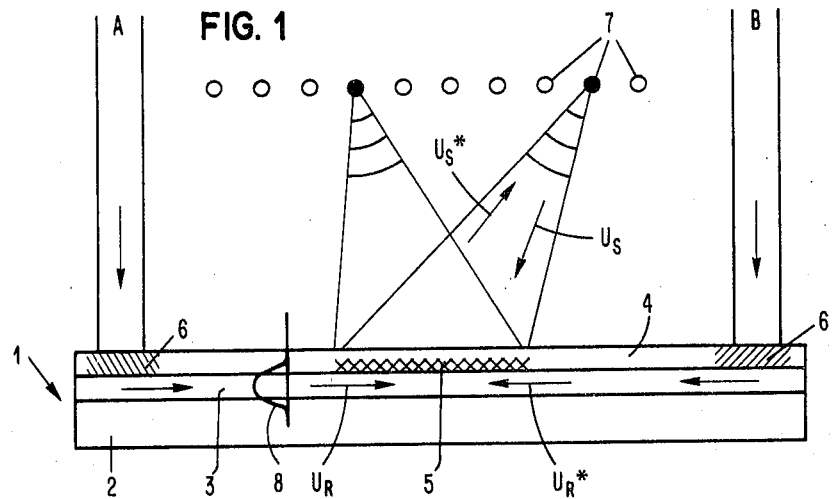
FIG. 1—the structure of a document card and the operation of a waveguide hologram, FIG. 2—schematically the recording of a waveguide hologram according to FIG. 1, FIG. 3—schematically the read-out of a waveguide hologram according to FIG. 1.

In FIG. 1, the fundamental structure of a document card or device 1, comprising an optical waveguide and a waveguide hologram, is depicted. This structure includes a substrate or base 2 on which are deposited a planar transparent layer waveguide 3 for the propagation of light and photosensitive image layer 4. For ease of representation of the particular layers, the scale of thickness has been enlarged arbitrarily. The photosensitive layer 4 contains a waveguide hologram 5, bearing information and light coupling gratings 6 located near the left or right edge, respectively. By these gratings, light meeting specified characteristics is coupled into the waveguide 3. They may consist of volume holograms which have been recorded in the appropriate place of photosensitive layer 4.

For recording a waveguide hologram containing information, radiation of a coherent light source is used which, for instance, is introduced into waveguide 3 from point A over the left grating coupler 6. The light propagates in the waveguide as reference wave $U_R$ along the arrow and corresponds to an electric field distribution represented by curve 8. It is seen that an exponentially evanescent part only of the radiation penetrates a small distance into the photosensitive layer and contributes there to the formation of a hologram. The information to be recorded in the hologram is an object represented by a number of point sources 7 emitting object waves $U_S$.

The superposition of temporally coherent waves $U_R$ and $U_S$ in the photosensitive layer 4 bordering waveguide 3 produces an interference pattern which corresponds to hologram 5. Phototechnical details like developing and fixing of this hologram are not described here, and form no part of this invention. It remains to mention that the information or object to be recorded can arbitrarily be chosen. Linear or two-dimensional information is acceptable as well as pictures, text or any coded information. As a simplification, it is assumed that the data, i.e. the information to be recorded, consists of a particular arrangement of point sources corresponding to a specific signal.

The information is extracted from the generated hologram in accordance with principles well known in holography. From point B, radiation of a coherent light source equal in wavelength to the one used for recording, is directed to the grating coupler 6 near the right edge. Thereby, the conjugate reference wave $U_R^*$ is generated in optical waveguide 3. Said wave propagates, as indicated by an arrow, in a direction opposite to that of reference wave $U_R$ and illuminates or develops by its evanescent field the hologram 5 generated earlier. Under these conditions, the latter emits conjugate object waves $U_S^*$ which converge into an exact image of the original point sources 7 and at the same place.

Figure 2:
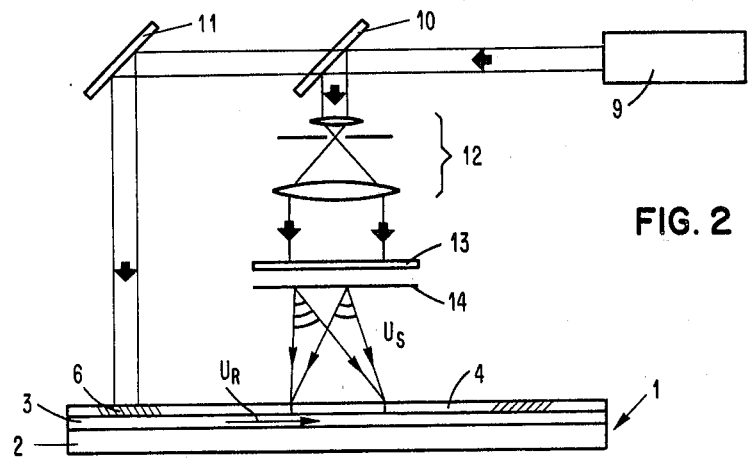

By reference to FIG. 2, an example will be illustrated, showing a feasible technique for waveguide hologram recording. A laser generator is used for the light source 9 which directs its beam along an arrow to a semi-transparent mirror 10, acting as a beam splitter. The transmitted half of the beam strikes a deflection mirror 11 and is diverted to grating coupler 6. This coupler generates the reference wave $U_R$ in waveguide 3 of the device 1 propagating along the arrow. The other half of the beam diverted by the beam splitter 10 reaches a telecentric objective 12 for beam expansion. The beam emerging from this objective illuminates through a diffusor 13 a mask 14 containing holes. These holes represent optionally coded information emitting corresponding object or signal waves $U_S$ directed to the device 1, where interference patterns are formed in photosensitive layer 4 when said waves coincide with reference wave $U_R$. After appropriate developing and fixing in a phototechnical process, waveguide hologram 5 is produced as shown in FIG. 1.

Figure 3:
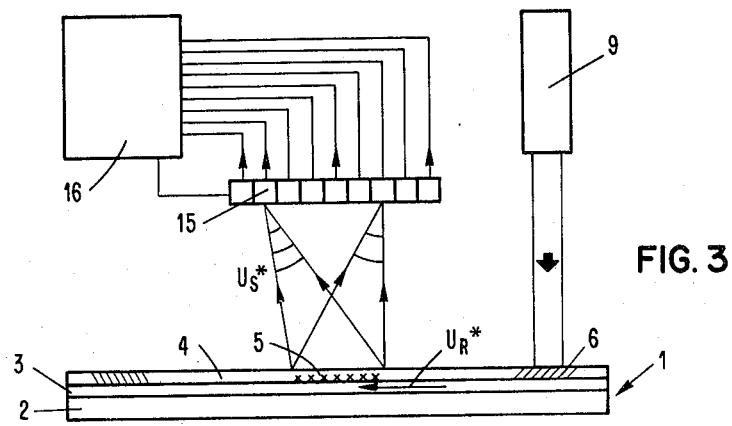

FIG. 3 presents the scheme of an arrangement for reading-out waveguide holograms 5, generated for instance according to FIG. 2, and for retrieving the corresponding data signals. A similar laser beam generator 9, as in FIG. 2, is used to illuminate a grating coupler 6 near the right edge of device 1. Thus, as described in FIG. 1, conjugate reference wave $U_R^*$ is generated in optical waveguide 3 which propagates in direction of the arrow toward an earlier recorded waveguide hologram. The illumination of said hologram 5 now generates conjugate signal waves $U_S^*$ which converge in some place above the hologram into an exact image of the mask 14 with its holes as used for hologram recording and shown in FIG. 2. At this same place, an array 15 of photosensitive detectors, such as photodiodes, is provided and connected to a detecting and decoding circuit 16.

If the mask 14 originally used in FIG. 2 contains a number of holes arranged in one line only, then a row of N photodiodes for instance is satisfactory as a detector array 15. However, a mask with a maximum of N×M holes and arbitrary coding can be used to represent information. In the latter case, the detector array 15 will be formed by a matrix of N×M photodiodes. Each light spot corresponding to a hole of the mask will initiate a current in a photodiode which, together with other photocurrents, will be decoded in decoder 16 to retrieve the original information. It should be added that for read-out in accordance with FIG. 3, laser beam generator 9 can be exchanged with a less expensive light source, such as a light emitting diode (LED), if less quality with respect to contrast of the image is acceptable. In this case, a partially coherent light source is sufficient.

Figure 4:
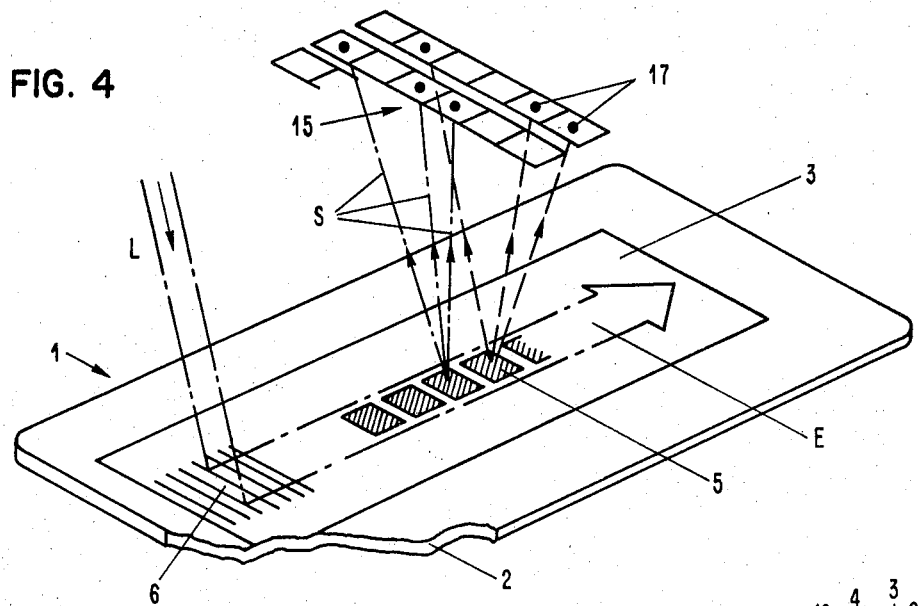
FIG. 4—an example of a document card in accordance with the present invention including a waveguide hologram, FIGS. 5-7—further examples of such document cards, each of them with a representation, how one or more holograms can be destroyed or made inoperative, FIG. 8—the fundamental structure of an apparatus for serial read-out of particular waveguide holograms included in a document card according to the present invention, FIG. 9—the schematic representation of a detector circuit with automatic threshold adjustment to compensate for differences in brightness during read-out, FIG. 10—the representation of light waves passing through a conventional hologram record imbedded between two protection layers, one of which is damaged by a scratch, FIG. 11—the propagation of light waves during read-out of a waveguide hologram with a damaged protection layer, and FIG. 12—the fundamental representation of an encrypted light wave coupled into a waveguide by means of an input grating coupler, which has been generated as a source hologram.

In FIG. 4, a document card according to the present invention and corresponding to the fundamental device 1 of FIG. 1 is shown without really depicting the stratified structure of the card. That structure primarily comprises substrate 2 as the thickest part, carrying thereon optical waveguide 3 on which at least one grating coupler 6 and several information holograms 5 are placed. For simplification, it is assumed that originally the information has been recorded in one line only, i.e. one single line of holes per hologram, although the recording can be done in two dimensions as well. Therefore, a single hologram corresponds to a pattern of point sources which during read-out are reproduced as light spots 17 forming a pattern of information. As explained earlier, a light beam L, which is at least partially coherent, is introduced during this procedure through grating coupler 6 into waveguide 3. Inside of waveguide 3, the energy propagates wave-like along a light path in the direction of arrow E. The holograms excited by these light waves generate signal beams S which converge and form an image of said light spots 17 on the detector array 15. Once decoded, the originally recorded information is again available for further use.

It is conceivable to use a card, as shown in FIG. 4 for example, as a personal identity card which can secure to a legitimate owner admittance to places where access is restricted. Then the information recorded in the holograms can contain personal data of the owner of the card which can be verified as well as conditions of access to be satisfied. Use as a credit card or to effect payment can also be envisaged whereby the holograms may contain data about available credit to pay for purchases or to obtain cash from a bank. Thereby, monetary units can be recorded and the recordings can merely be made in binary form or instead of this any coding scheme such as 3-out-of-5 may be used.

Figure 5:
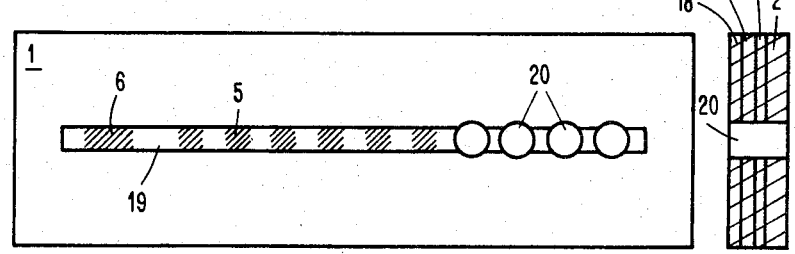
Figure 6:
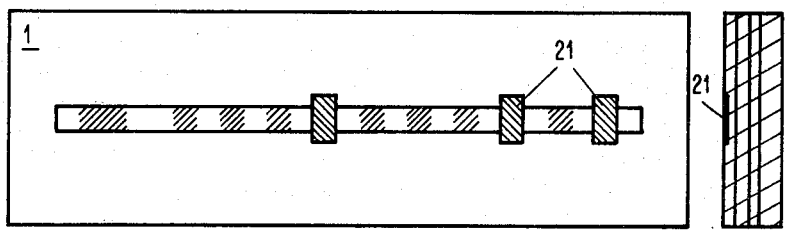
Figure 7:
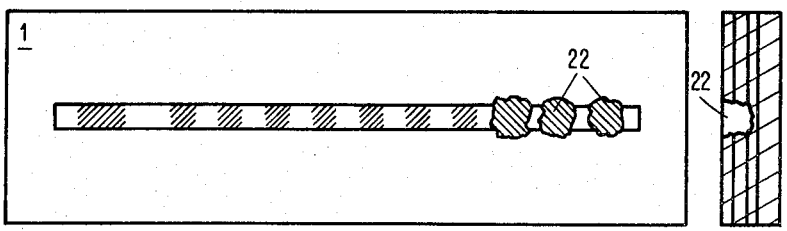

In FIGS. 5 to 7, it is shown that holograms of such cards can be cancelled or made inoperative. In FIG. 5, a number of single holograms 5 and a grating coupler 6 are arranged in successive portions of a recording strip 19. The respective cross-section on the right of the drawing shows that the particular layers are arranged as usual: Substrate 2/waveguide 3/photosensitive layer 4 including holograms 5. This stack as a whole is now covered by a transparent protection layer 18 to preserve the card from dage and wear. The four last holograms near the right edge of card 1 have been removed or otherwise destroyed, each by a perforation 20. Therefore, this card will be spent at the time when every hologram will be destroyed.

In FIG. 6, a card 1 is shown on which the surface overlaying in some places particular holograms has artificially been roughened or made opaque by any means. For this, the protection layer can be etched, ground, scratched or covered with non-removable paint. In accordance with FIG. 7, also thermal destruction 22 of the protection layer and eventually of the holograms, can be considered. Cancellations of this sort cannot be remedied. If cancelling occurs as shown in FIGS. 5 and 7, disturbing the light beam in waveguide 3 or even interrupting it, then said operation should start at the outer right edge with the hologram that is most distant from the light coupler 6, and proceed successively to the left. However, cancellations according to FIG. 6 are not bound to any order of succession.

The protective layer 18 of FIG. 6 could also comprise a liquid crystal film which can be made opaque in places by control from without. This allows, if needed, to render such a place its transparency, thereby enabling again the later read-out of the hologram below. This would permit to make longer use of the cards in accordance with the present invention.

Figure 8:
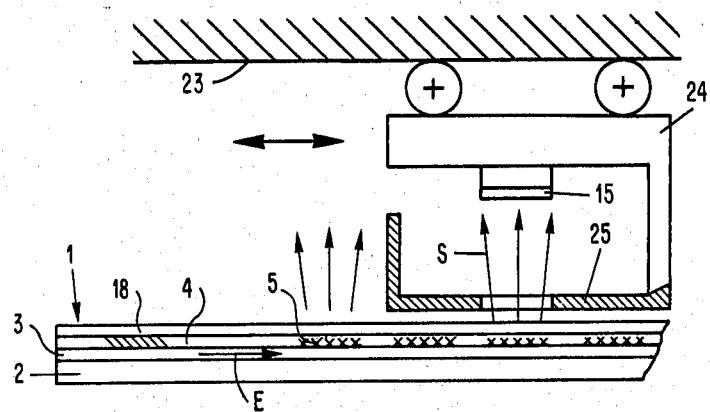

In FIG. 8, an apparatus is illustrated by which a card 1 of the present invention can be read serially. In a frame 23 of the apparatus, a carriage 24 is slidingly disposed which moves past card 1. The carriage bears a screening plate 25 with an opening through which the radiation S of a single hologram 5 can be transmitted. An array 15 of radiation detectors, such as photodiodes, is also mounted on the carriage 24. Thus the pattern of radiation of each hologram can be scanned individually. The screening plate 25 prevents interferences caused by the radiation of holograms nearby the one to be read. As an alternative, an optical scanning device could be used.

Figure 9:
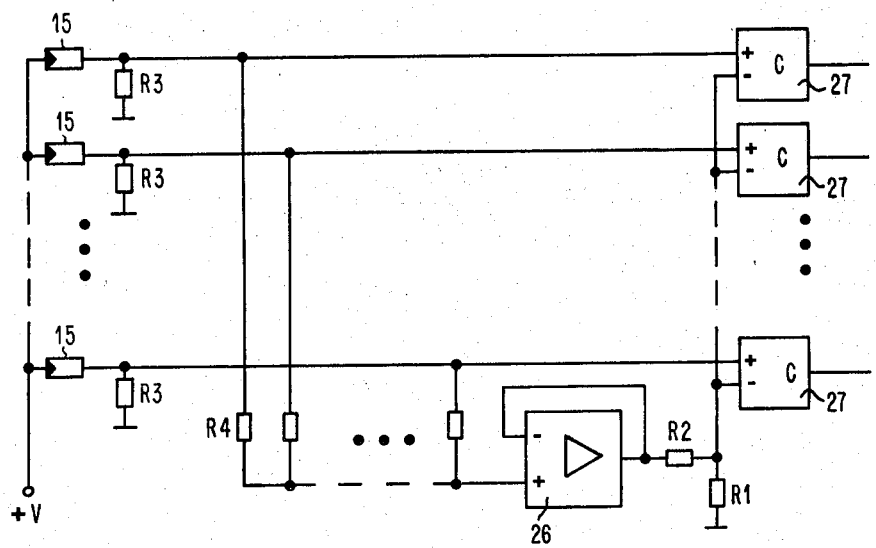

FIG. 9 shows a detector circuit provided with an automatic threshold adjustment to compensate for differences in brightness. Individual detector elements 15, such as photodiodes, are each connected in series with a resistor R3. If radiation impinges on the detector, then the current flow through the corresponding resistor R3 generates a signal voltage. Each signal is applied to the first input of a particular comparator 27 and, at the same time, through a resistor R4 to one input of a summing amplifier 26, the output of which is negatively fed back to its second input for stabilization. The summed output signal of amplifier 26 is fed to series connected resistors R1 and R2, whereby the part of the voltage drop produced by resistor R1 is applied over a common line to the second inputs of all comparators 27.

The voltage division ratio $R1/(R1+R2)$ at the output of summing amplifier 26 depends on the number of signals to be expected simultaneously at the input of said amplifier during a detector operation. If, for example, it is assumed that each hologram contains decimal digits coded according to the 3-out-of-5 scheme, then three signals will be generated regularly in the detector circuit of FIG. 9 for each digit to be read. The summed output signal of amplifier 26, therefore, is preferably reduced to 1/6. Thus each comparator 27 receives a reference voltage signal of about half the magnitude of the signal to be expected from photoelement 15 at the positive input. In this manner, every comparator can reliably decide whether there is a signal at its input or not. Therefore, such decisions are almost independent of existing differences in brightness. The outputs of comparators 27 are fed to a decoder logic which can be built according to known principles. It should be added that in the example mentioned, the voltage division ratio is independent of the coded signal pattern. For a variable number of available signals, this is not true.

FIGS. 10 and 11 illustrate how a document card 1, FIG. 11, constructed according to the present invention containing an integrated waveguide 3 and holograms 5 and manufactured as described in FIGS. 1 and 2 offers advantages as compared to a conventional card 1a, FIG. 10, employing an amplitude hologram 5a. With the latter, a difficulty is encountered, namely that an observer in the area of the reproduced image or object looks directly or indirectly at the blinding light source used to reconstruct the object. This considerably limits the useful angle of aperture and causes a poor signal-to-noise ratio.

Quite in contrast, that source of noise does not exist with waveguide holograms. Therefore, an object can be recorded as well as reconstructed in a much wider space angle than before. The wide field of view allows use of a relatively large detector array. It is easily aligned with the hologram, thereby minimizing crosstalk between adjacent photodiodes.

The condition in which a structural surface overlies a hologram to be read, can be the cause for further trouble. It is assumed that each hologram 5 or 5a is covered by at least one protection layer 18 or 18a, as shown in FIGS. 10 and 11. If, from using the card 1a, a scratch such as 28a occurs in the protection layer 18a overlying hologram 5a, then that scratch will generate a noise signal N during read-out which will be superposed on the desired signal S. It is to be seen from FIG. 10 that parallel wave fronts of lights L are incident on card 1a with a hologram 5a. In the lower protection layer 18a, the cross-section of a deep scratch 28a is indicated which will become the source of a diffracted interfering radiation N.

The desired signal waves S emerging from the hologram reach the detector array 15 simultaneously with the interfering wave N. Typically, the diffraction efficiency of an amplitude hologram is about 6%, i.e. the light intensity of radiation S reaching the photodiodes has that magnitude. It will be assumed that the scratch 28a scatters about 5% of the incident light L and acts as a diffusing source of interfering radiation N. For the detector array 15, the level of noise is almost equal to that of the desired signal, i.e. the signal-to-noise ratio is about 0 dB and errorless detection of the hologram is impossible.

In FIG. 11, the effect of a scratch 28 in the protection layer 18 overlying waveguide hologram 5 is shown. The incident light E for illumination of the hologram is now confined to the waveguide 2. The diffraction efficiency is also assumed to be 6% and, therefore, this part of the magnitude of incident waves illuminates the detector array 15, as well as the scratch 28. No other direct illumination of said scratch exists. If the scratch again scatters about 5% of the incident light, then the interfering radiation N has the magnitude of 6%×5%×0.3% of the incident light E reaching the photodetectors. Under these conditions, scratches will hardly impair the reliability of the hologram read-out and the signal-to-noise ratio in using cards with waveguide holograms is better by about one or two orders of magnitude. In this case, said ratio additionally is independent of the diffraction efficiency. A document card, in accordance with the present invention, consequently is less susceptible to interference than the cards known so far.

It is most important, independently of the purpose of a document card, for falsification or counterfeiting of it to be difficult or impossible. Known types of cards with magnetic records have been copied with relative ease. Cards with conventional holograms have been read easily by using phototechnical methods. The card, according to the present invention containing waveguide holograms, requires highly sophisticated means and know-how if it is to be illegally read-out. Therefore, it is more secure. FIG. 12 illustrates a method which provides a substantial increase in security against illegal read-out of the invented document card.

It has already been explained in relation to FIG. 1 that two grating couplers 6 are used to introduce light into waveguide 3. Those grating couplers may be volume holograms which are manufactured in the photosensitive layer 4 by a conventional process. As known in the state of this art, such holograms are made for an illumination with plane or spherical wavefronts of light, and offer thereby some security against illegal reading. However, security can be highly improved in using complex wavefronts to produce coupler holograms, such as wavefronts corresponding to an optional pattern of holes. A coupler hologram of this kind transmits light only when illuminated by the same complex wavefront of light, which has been used for its production. In the present case, this means that light can enter the waveguide only if the appropriate key is known. After the production of information holograms 5 and of the coded coupler hologram the simple grating coupler hologram 6 used for this purpose is destroyed. Such a card is readable only if the the encryption is known.

In FIG. 12, a light source 29 is shown which is at least partially coherent and illuminates through a lens system 30 a mask 31 containing holes to provide a unique light source pattern. Said light source may be a laser beam generator, or a less expensive light emitting diode (LED), or even an electric bulb with an appropriate filter. The holes in the mask represent a key for the entrance of light into optical waveguide 3 through coded coupler hologram 6. The holes in mask 31 represent point sources, the arrangement of which determines the wavefronts of radiation L. Therefore, the waveguide 3 can be driven only when the arrangement of the holes is correct, which means the key is known. If this is the case, read-out of a document card 1 with waveguide holograms 5 can proceed correctly by selectively detecting the emerging signal waves S as shown in FIG. 8.

Additional safeguarding of the invented document card, by a key against illegal read-out, provides different opportunities for the use of such cards. For example, cards of different classes of users can be distributed which are discernible by distinct keys and serve different purposes. A secondary key may also be assigned to a particular user which, when the document card is used, must be entered by means of a keyboard in order to set the primary key in the associated detection system. When the primary key corresponds with the coupler hologram of the respective document card, and only then, its further appropriate utilization is enabled, for instance, as a credit card.

The document card, according to the present invention, shows little susceptibility to disturbances, and can absorb a relatively large amount of information, since the holograms need not be as large as before. The single holograms can be read serially and be shaped in order to be cancelled by various methods. In a suitable detection apparatus, a rather inexpensive light source will satisfy. Further, for the purpose of enhancing security against abuse, keys may be employed, such as masks containing holes. Therefore, no misuse and no counterfeiting is possible unless a large expenditure of technical means is made.

We claim:

1. A document form comprising a base, a transparent layer overlying said base and forming an optical waveguide defining an elongated light path extending parallel to said base, an image layer contiguously overlying said transparent layer and containing, at a first location along said light path, at least one hologram that is developable in response to light of a given wave length traveling through said wave guide, and means, located at a second location along said light path, for coupling only light of said given wave length from outside said card into said transparent layer, said coupling means comprising a further hologram of a unique light source pattern whereby only light of said unique light source pattern can be coupled to said transparent layer.

2. A document form as defined in claim 1 wherein a plurality of holograms are formed in successive locations along said light path.

3. A document form as defined in claim 1, wherein said coupling means comprises a grating coupler.

4. A document form as defined in claim 1 further comprising a transparent protective layer overlying said image layer.

5. A document form as defined in claim 2, wherein a portion of said image layer is removed at a location along said light path to obliterate at least one hologram without interfering with the continuity of said light path between said coupling means and at least one other of said plurality of holograms.

* * * * *